United States Patent
Kannan et al.

(10) Patent No.: US 12,277,932 B2
(45) Date of Patent: Apr. 15, 2025

(54) REACTIVE VOICE DEVICE MANAGEMENT

(71) Applicant: International Business Machines Corporation, Armonk, NY (US)

(72) Inventors: Sridevi Kannan, Katupakkam (IN); Sathya Santhar, Ramapuram (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 17/496,238

(22) Filed: Oct. 7, 2021

(65) Prior Publication Data

US 2023/0113524 A1 Apr. 13, 2023

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/223* (2013.01)

(58) Field of Classification Search
CPC ................................ G06F 3/167; G10L 15/22
See application file for complete search history.

(56) References Cited

U.S. PATENT DOCUMENTS

| | | | |
|---|---|---|---|
| 10,460,292 B2 | 10/2019 | Walker et al. | |
| 10,579,834 B2* | 3/2020 | Walia | G06F 40/232 |
| 10,706,848 B1* | 7/2020 | Greene | G10L 15/30 |
| 10,847,149 B1 | 11/2020 | Mok | |
| 10,908,874 B2* | 2/2021 | Fountaine | G10L 21/06 |
| 11,527,246 B2 | 12/2022 | Mixter | |
| 2017/0272362 A1 | 9/2017 | Atlas | |
| 2018/0322870 A1 | 11/2018 | Lee | |
| 2019/0103103 A1 | 4/2019 | Ni et al. | |
| 2019/0212976 A1* | 7/2019 | Fountaine | G10L 21/06 |
| 2019/0266236 A1 | 8/2019 | Battach | |
| 2019/0371342 A1 | 12/2019 | Tukka | |
| 2021/0104220 A1 | 4/2021 | Mennicken | |

(Continued)

FOREIGN PATENT DOCUMENTS

| | | |
|---|---|---|
| CN | 112331190 A | 2/2021 |
| EP | 2857958 A1 | 4/2015 |

(Continued)

OTHER PUBLICATIONS

Anonymous; Method and System for AI Voice Assistance System to Offer Help; IP.com; IPCOM000165423D; Apr. 8, 2021; 5 pages.

(Continued)

*Primary Examiner* — Feng-Tzer Tzeng
(74) *Attorney, Agent, or Firm* — Daniel J Blabolil

(57) ABSTRACT

One or more user interactions directed to a set of one or more voice-controlled devices in an environment are received by a first connected device. A first input to a first voice-controlled device of the set of voice-controlled devices is detected based on the user interactions. A potential second input to the set of voice-controlled devices is determined in response to the first input and based on an activity model. A deviation from the potential second input is monitored for, in response to the first input and from the user interactions. An activity anomaly in the environment is identified based on the monitoring. A correction action is performed in response to the activity anomaly.

20 Claims, 12 Drawing Sheets

(56) References Cited

U.S. PATENT DOCUMENTS

2021/0142189 A1     5/2021    Subramanya
2021/0183393 A1     6/2021    Lee

FOREIGN PATENT DOCUMENTS

| WO | 2018106289 A1 | | 6/2018 | |
|---|---|---|---|---|
| WO | 2020013577 A1 | | 1/2020 | |
| WO | WO-2020226667 A1 | * | 11/2020 | ............ G06F 3/167 |
| WO | 2021034038 A1 | | 2/2021 | |

OTHER PUBLICATIONS

Patent Cooperation Treaty (PCT), Transmittal of the International Search Report and the Written Opinion of the International Searching Authority, Date of Mailing Feb. 3, 2023, International Application No. PCT/EP2022/077173, 16 pages.

Samie et al., "Hierarchical Classification for Constrained IoT Devices: A Case Study on Human Activity Recognition", IEEE Internet of Things Journal, vol. 7, No. 9, Sep. 2020.

Summerson, Cameron; How to Enable and Use Continued Conversation on Google Home; https://www.howtogeek.com/357104/how-to-enable-and-use-continued-conversation-on-google-home/; Mar. 8, 2019; 10 pages.

Vilar et al., "A prediction classifier architecture to forecast device status on smart environments", IEEE International Conference on Systems, Man, and Cybernetics, Oct. 9, 2016.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

REACTIVE VOICE DEVICE MANAGEMENT

BACKGROUND

The present disclosure relates to voice-based devices, and more specifically, to management of voice-based devices using artificial intelligence techniques.

Voice-based devices may operate based on an audio interface. Voice-based devices may receive commands from a user. Voice-based devices may operate based solely on rigid or specific commands.

SUMMARY

According to embodiments, disclosed are a method, system, and computer program product.

One or more user interactions directed to a set of one or more voice-controlled devices in an environment are received by a first connected device. A first input to a first voice-controlled device of the set of voice-controlled devices is detected based on the user interactions. A potential second input to the set of voice-controlled devices is determined in response to the first input and based on an activity model. A deviation from the potential second input is monitored for, in response to the first input and from the user interactions. An activity anomaly in the environment is identified based on the monitoring. A correction action is performed in response to the activity anomaly.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
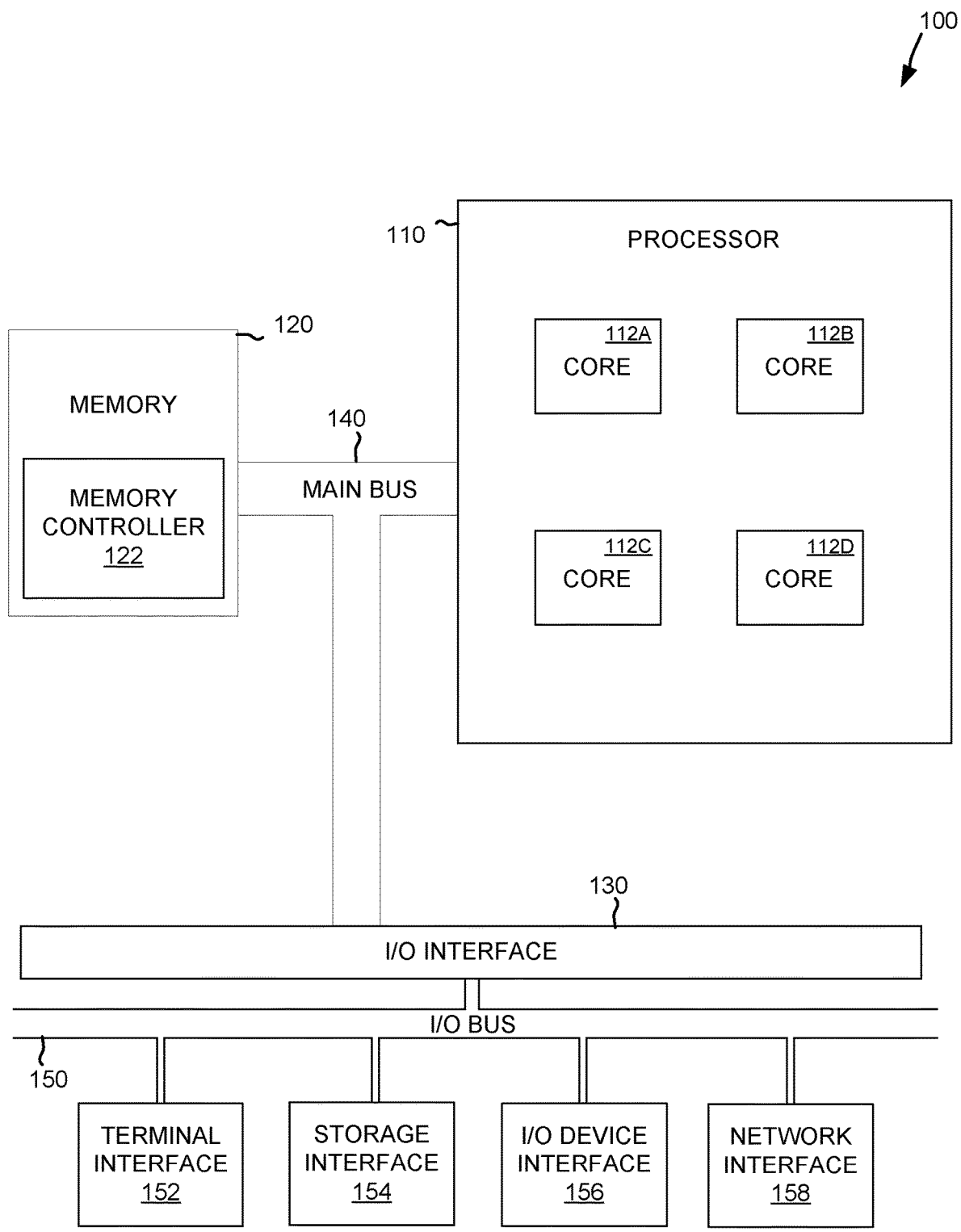
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to voice-based devices, and more particular aspects relate to management of voice-based devices using artificial intelligence techniques. While the present disclosure is not necessarily limited to such applications, various aspects of the disclosure may be appreciated through a discussion of various examples using this context.

Voice-controlled client devices—alternatively, voice-controlled devices, or voice-based devices— ("voice devices") may be computing devices that operate based on audible input from a user, such as speech. Voice devices may be increasingly popular due to one or more factors. One factor includes that voice devices may facilitate usage of a user that may be perceived as intuitive. Users may be used to speaking commands or questions to computers, as the voice devices may be programmed to respond to similar commands (e.g., "how is the weather today?"). Another factor includes that voice devices may allow for multi-tasking in real-world scenarios (e.g., a user may be able to operate voice devices while their hands are full with other tasks). For example, a user may be able to tell a voice device to turn on the lights while they are walking a dog.

Another factor may be that the cost of computer components (e.g., memory, processors, audio transceivers) have decreased to such a level that voice devices are readily available or built into all sorts of devices. These voice devices may include computer devices (e.g., laptops, desktops), portable electronic devices (e.g., smartphones, tablets), and/or wearable client devices (e.g., augmented reality glasses). The voice devices may also be appliances (e.g., smart refrigerators, voice-controlled washing machines, drink machines with voice-based interfaces, etc.). In some cases, voice devices may include devices that operate solely based on receiving an audible or verbal input from a user (e.g., a voice-based assistant without any touchscreen, physical buttons, or other method of receiving input besides voice commands).

The voice devices may have limited functionality in certain scenarios and that may prove difficult or impossible for operation of voice devices. Specifically, voice devices may operate solely on rigid or fixed commands. For example, a voice device located in a home office may respond to "tell me what the temperature is," but may not respond to "what is the weather right now?" or not respond to "is it raining here?" Another issue may be due to a limited knowledge of how to respond. The limited knowledge may include voice device responding to a user by playing an audio sample that is of a limited domain or that is overly generic (e.g., an audio file of "invalid command", or a sound wave of "something's wrong", or a visible message on a screen of "I can't answer").

Existing solutions may not be adequate for dealing with all the scenarios. One existing solution may be to connect a device to a network, such as the Internet, to perform additional processing (e.g., by a computer or by a tech support user). These solutions may be invasive of a user's privacy, such as by monitoring voice input to voice devices in a residential setting. Further, the constant monitoring may not even be possible during certain times. For example, a user may travel to a remote location with a smartphone that operates as a voice device. The smartphone may not have any network connectivity, and network-based audio listening and processing may fail to operate at all.

Another existing solution may be to generate an exceedingly large selection of commands and responses to attempt to cover every scenario that could happen with a voice device. Specifically, a voice device may include dozens or hundreds of commands that a user could potentially provide. There are drawbacks to this existing solution as well. For instance, a larger memory or storage subsystem in a voice device may be required to provide for all the potential audible questions and voice recordings of potential answers. Further, as language is not fixed and is constantly evolving, a relatively large dataset may not cover future methods of communication.

Another drawback is that users are not perfect and may not always operate a voice device in a manner that is predictable or understandable. Specifically, there are situations where a given user may forget to submit a voice command, even though for correct operation a voice device expects the voice command. The user may be busy attending to other activities and may forget to speak aloud the voice command. For example, a user may place a cup of tea in a smart microwave appliance. The smart microwave appliance may be a voice device that is configured to heat items after receiving voice commands. After placing the cup of tea in the smart microwave appliance, the user may normally be required to speak a particular command to initiate heating of the tea. The user may also be actively taking care of children and may accidentally forget to speak the particular verbal command.

In a second example, a first user may place tea inside a microwave at a residence. The first user may accidentally speak an unexpected, unwanted, or otherwise anomalous command. For instance, the user may be also talking on the phone with another person while trying to heat up tea. The other person may ask on the phone how long the first user plans to take to get ready to leave, and the first user may reply "forty-five minutes and then I will be ready to leave." The microwave may incorrectly interpret the time to heat the tea as forty-five minutes.

Reactive voice device management ("RVM") may operate to perform detection of input of a user, and to responsively determine potential additional inputs for beneficial processing and operations (e.g., management) of voice devices. The RVM may operate by receiving user interactions that are directed to one or more voice devices, such as smartphones, voice-based assistants, voice-operated appliances, and the like. Specifically, the voice devices may be computers, smart appliances, voice-based assistants, or other relevant voice devices in an environment of the user (e.g., a home, an office, a school). The RVM may be configured to process actions and commands of a user through a machine learning model or other relevant artificial intelligence and perform respective corrective actions.

In detail, the RVM may be configured to determine a routine or pattern of usage of a user, such as by generating based on the machine learning, an activity model that considers the various usage patterns of users in the environment as well as the voice devices that are a part of the usage patterns. The routine or pattern may be based on previous usage of the voice devices. Further, the RVM may perform corrective actions, based on detecting input to the voice devices. Specifically, the RVM may be configured to detect input to a voice device in the environment, the input may be a part of one or more user interactions that are received by connected devices. Based on a pre-generated activity model and in response to detected input, the RVM may determine a potential second input ("second input"). A second input may be an upcoming, future, or predicted input that corresponds to a routine or pattern of usage in the environment. The RVM may further monitor for any additional input of the user as the user performs interactions with the voice devices. The RVM may monitor for a deviation and may identify, based on the monitoring, an activity anomaly ("anomaly") in the environment.

The anomaly may be a missing input from a user (e.g., a user not speaking a corresponding follow-up instruction, a user does not perform a specific follow-up action). The anomaly may be incorrect input from a user (e.g., a user speaking the wrong command, a user performing the wrong physical action). The anomaly may be any input that does not match a pattern, routine, or series of inputs that are a part of the activity model. The corrective actions may include generating a response to a user that includes the specifics of a missed or anomalous input. The generated responses may be based not only on the activity anomaly, but also based on the pattern, routine, and the determined second input of a user The RVM may operate to overcome one or more of the existing voice-controlled device issues. First, the RVM may be configured to operate by a connected device. A connected device may be a cloud-connected device such as a server, for processing user interactions. In some embodiments, the connected device may be a dedicated device, such as a computer, configured to perform processing for the RVM. In some embodiments, the connected device may be one of the voice devices that is also configured to receive audio input from a user and respond with audio output. By operating locally, the RVM may enable local processing of voice data without connecting to an external server.

Another advantage is the RVM may operate without a fixed set of commands and responses. Specifically, the RVM may perform one or more artificial intelligence techniques (e.g., machine learning) to determine a routine, activity, or pattern. Because of the machine learning, the RVM may be able to detect a particular anomaly regarding user interactions with a voice even if a particular interaction was not previously a part of an anomalous list. Further, the RVM may be able to generate a verbal response to a user even if the words and phrases were not initially a part of the vocabulary stored in a device.

Further, the RVM may be beneficial as users continue to use voice devices in more complicated ways. In detail, as a user uses voice devices in an environment, they may begin to use devices in a more elaborate way or concertedly with other voice devices. For example, a user may begin to use a voice-enabled coffee machine in the morning, and the RVM may receiving training data that includes the times and settings of the coffee machine. As the user consistently wakes up around the same time and does the same actions, the RVM may update the activity model including this data. Later (e.g., days, weeks, months), the user may also install and begin to issue voice commands or physical inputs to a smart lamp in the same room as the voice-enable coffee machine. The usage of the smart lamp may also be input into the RVM, and the activity model may include usage information of both devices. Subsequently, when a user performs user interactions that are directed at either the smart lamp or the voice-enable coffee machine, each of the devices may be monitored for a potential second input. The monitoring for a potential input may now be monitoring for a deviation from a pattern created in the activity model that corresponds to both voice devices. As a result, the RVM may compare the input of the user interactions to the trained activity model and the RVM may identify any anomaly, not just to one of the voice devices, but to either the smart lamp, the voice-enable coffee machine, or both.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
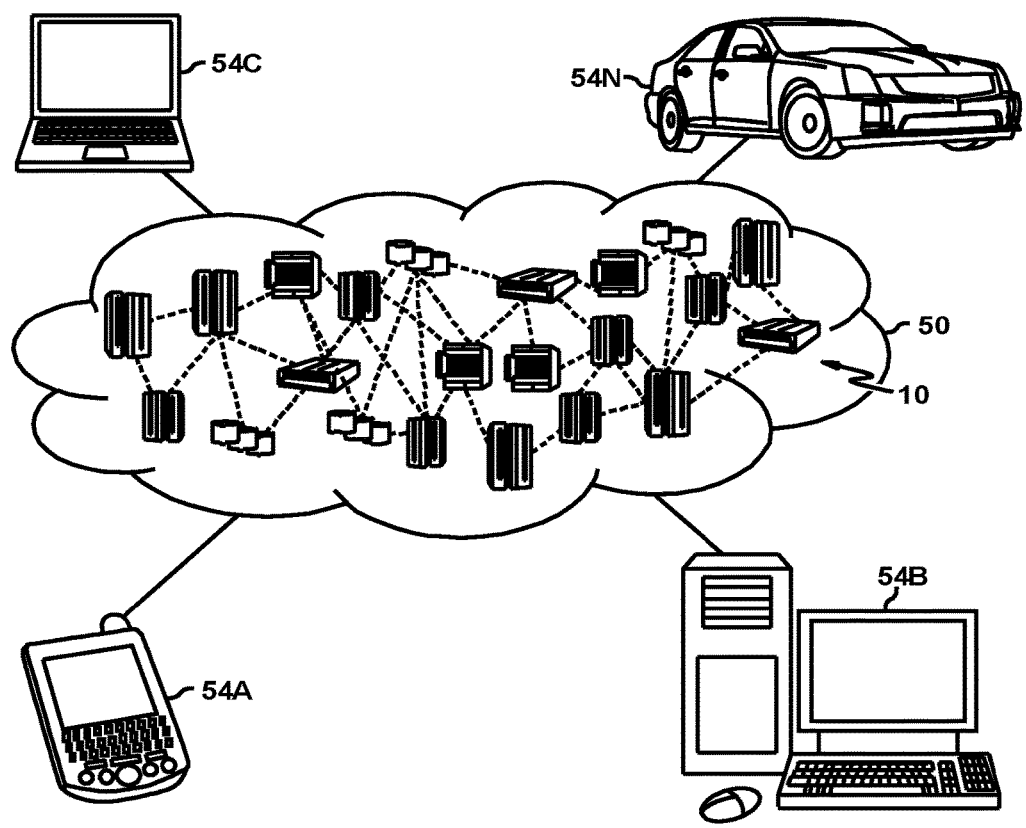
FIG. 2 depicts a cloud computing environment according to an embodiment of the present invention.
Figure 3:
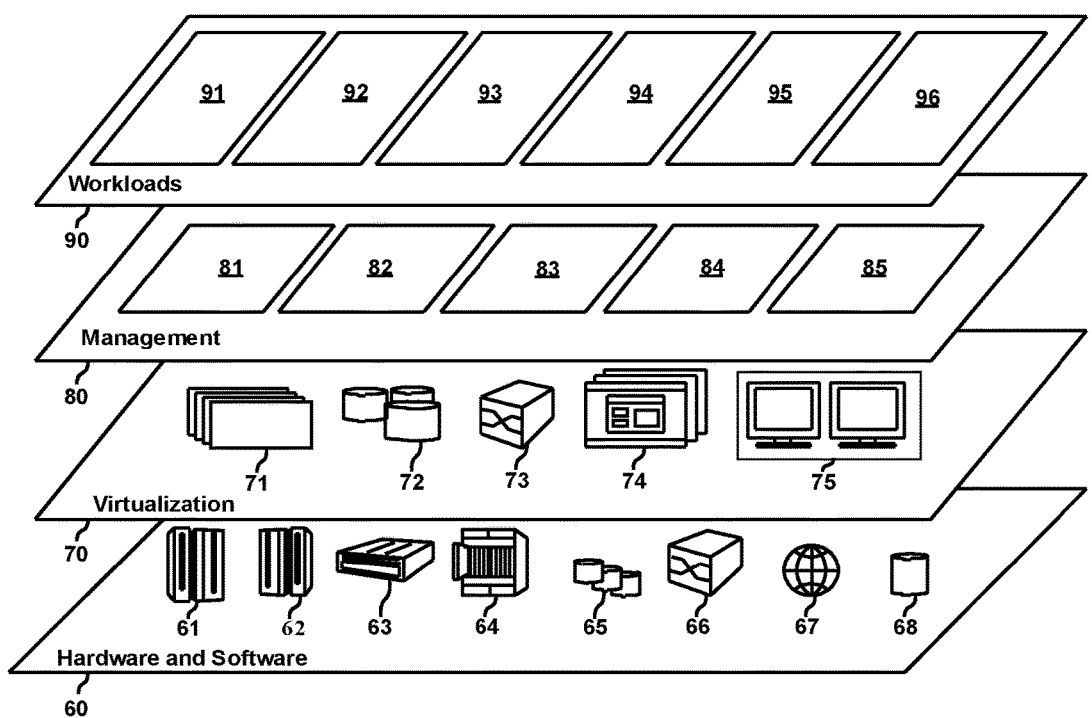
FIG. 3 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and RVM 96.

Figure 4:
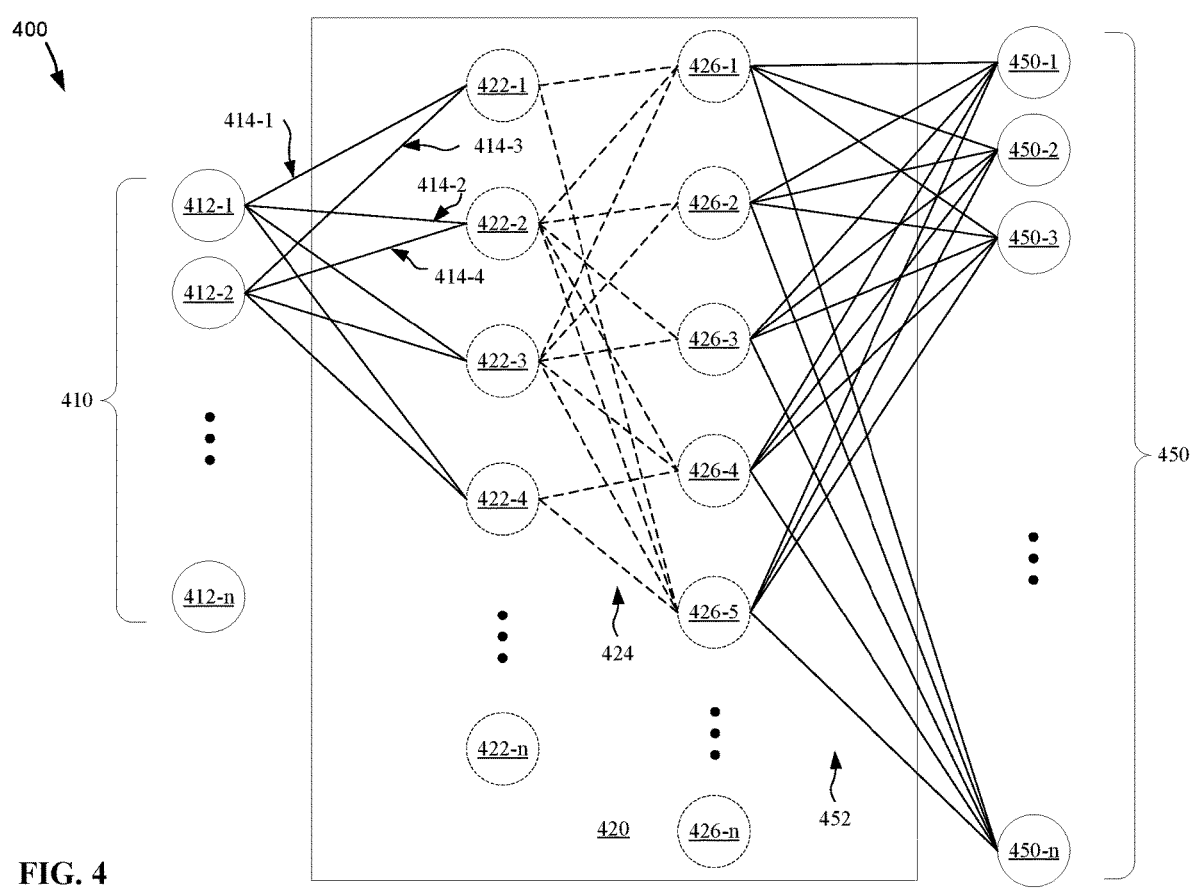
FIG. 4 depicts an example neural network representative of one or more artificial neural networks capable performing reactive voice device management ("RVM") on one or more voice devices in an environment consistent with embodiments of the present disclosure.

FIG. 4 depicts an example neural network (alternatively, "network") 400 representative of one or more artificial neural networks capable performing RVM on one or more voice devices in an environment consistent with embodiments of the present disclosure. The example neural network 400 is made up of a plurality of layers. The network 400 includes an input layer 410, a hidden section 420, and an output layer 450. Though network 400 depicts a feed-forward neural network, other neural networks layouts may also be contemplated, such as a recurrent neural network layout (not depicted). In some embodiments, the network 400 may be a design-and-run neural network and the layout depicted may be created by a computer programmer. In some embodiments, the network 400 may be a design-by-run neural network, and the layout depicted may be generated by the input of data and by the process of analyzing that data according to one or more defined heuristics. The network 400 may operate in a forward propagation by receiving an input and outputting a result of the input. The network 400 may adjust the values of various components of the neural network by a backward propagation (back propagation).

The input layer 410 includes a series of input neurons 412-1, 412-2, up to 412-*n* (collectively, 412) and a series of input connections 414-1, 414-2, 414-3, 414-4, etc. (collectively, 414). The input layer 410 represents the input from data that the neural network is supposed to analyze (e.g., a series of voice inputs, physical actions, related timestamps, expected routines, patterns, etc.). Each input neuron 412 may represent a subset of the input data. For example, the neural network 400 is provided with various numerical representations as input, and the voice device information and input from a user is represented by the numerical representations.

In another example, input neuron 412-1 may be the first pixel of a picture, input neuron 412-2 may be the second pixel of the picture, etc. The number of input neurons 412 may correspond to the size of the input. For example, when neural network 400 is designed to analyze images that are 256 pixels by 256 pixels, the neural network layout may include a series of 65,536 input neurons. The number of input neurons 412 may correspond to the type of input. For example, when the input is a color image that is 256 pixels by 256 pixels, the neural network layout may include a series of 196,608 input neurons (65,536 [$256^2$] input neurons for each of the red, green, and blue values of each pixel). The type of input neurons 412 may correspond to the type of input. In a first example, a neural network may analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, a neural network may analyze images that are color, and each of the input neurons may be represented as a three-dimensional vector for the color values of a given pixel of the input images. The first component of the vector may be a red whole-number value between 0 and 255, the second component a green whole-number value between 0 and 255, and the third component of the vector a blue whole-number value between 0 and 255.

The input connections 414 represent the output of the input neurons 412 to the hidden section 420. Each of the input connections 414 varies depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the network neural 400 may have different weightings for each connection 414, some embodiments may contemplate weights that are similar. In some embodiments, each of the values of the input neurons 412 and the connections 414 may be stored in memory.

The hidden section 420 includes one or more layers that receive inputs and produce outputs. The hidden section 120 includes a first hidden layer of calculation neurons 422-1, 422-2, 422-3, 422-4, up to 422-*n* (collectively, 422); a second hidden layer of calculation neurons 426-1, 426-2, 426-3, 426-4, 426-5, up to 426-*n* (collectively 426); and a series of hidden connections 424 coupling the first hidden layer and the second hidden layer. It should be appreciated that neural network 400 only depicts one of many neural networks capable of monitoring input from user interactions with voice devices consistent with some embodiments of the disclosure. Consequently, in some embodiments of the present disclosure, an example hidden section may include more or fewer hidden layers (e.g., one hidden layer, seven hidden layers, twelve hidden layers, etc.)— than the two hidden layers described with respect to hidden section 420.

The first hidden layer 422 includes the calculation neurons 422-1, 422-2, 422-3, 422-4, up to 422-*n*. Each calculation neuron of the first hidden layer 422 may receive as input one or more of the connections 414. For example, calculation neuron 422-1 receives input connection 414-1 and input connection 414-2. Each calculation neuron of the first hidden layer 422 also provides an output. The output is represented by the dotted lines of hidden connections 424 flowing out of the first hidden layer 422. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., sigmoid neurons or other logistic functions, tanh neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons must necessarily be stored in memory.

The neural network 400 may include the use of a sigmoid neuron for the activation function of calculation neuron 422-1. An equation (Equation 1, stated below) may represent the activation function of calculation neuron 412-1 as f(neuron). The logic of calculation neuron 422-1 may be the summation of each of the input connections that feed into calculation neuron 422-1 (i.e., input connection 414-1 and input connection 414-3) which are represented in EQUATION 1 as j. For each j, the weight w is multiplied by the value x of the given connected input neuron 412. The bias of the calculation neuron 422-1 is represented as b. Once each input connection j is summed the bias b is subtracted. In this example, the output of calculation neuron 422-1 may be determined accordingly: given a larger positive number of results from the summation and bias in activation f(neuron), the output of calculation neuron 422-1 approaches approximately 1; given a larger negative number of results from the summation and bias in activation f(neuron), the output of calculation neuron 422-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{EQUATION 1}$$

The second hidden layer 426 includes the calculation neurons 426-1, 426-2, 426-3, 426-4, 426-5, up to 426-n. In some embodiments, the calculation neurons of the second hidden layer 426 may operate similarly to the calculation neurons of the first hidden layer 422. For example, the calculation neurons 426-1 to 426-n may each operate with a similar activation function as the calculation neurons 422-1 to 422-n. In some embodiments, the calculation neurons of the second hidden layer 426 may operate differently to the calculation neurons of the first hidden layer 422. For example, the calculation neurons 426-1 to 426-n may have a first activation function, and the calculation neurons 422-1 to 422-n may have a second activation function.

Similarly, the connectivity to, from, and between the various layers of the hidden section 420 may also vary. For example, the input connections 414 may be fully connected to the first hidden layer 422 and hidden connections 424 may be fully connected from the first hidden layer to the second hidden layer 426. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 414 may not be fully connected to the first hidden layer 422 and the hidden connections 424 may not be fully connected from the first hidden layer to the second hidden layer 426.

Further, the parameters to, from, and between the various layers of the hidden section 420 may vary. In some embodiments, the parameters may include the weights and the biases. In some embodiments, there may be more or fewer parameters than the weights and biases. In some embodiments of the present disclosure, the network 400 may be a convolutional neural network or convolution network. The convolutional neural network may include a sequence of heterogeneous layers (e.g., an input layer 410, a convolution layer 422, a pooling layer 426, and an output layer 450). In such a network, the input layer 410 may hold the raw audio data of a voice input in a 2-dimensional volume of start time, length of sample, and microphone source. The convolutional layer of such a network may output from connections that are only local to the input layer to identify a feature in a small section of the image (e.g., a beginning of a verbal command from a user, the length of time it takes for a user to provide a verbal command, etc.). Given this example, the convolutional layer may include weights and biases, as well as additional parameters (e.g., depth, stride, and padding). The pooling layers 426 of such a network may take as input the output of the convolutional layers 422 but perform a fixed function operation (e.g., an operation that does not take into account any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-n (collectively, 450). The output layer 450 holds a result of the analysis of the neural network 400. In some embodiments, the output layer 450 may be a categorization layer used to identify a feature of the input to the network 400. For example, the network 400 may be a classification network trained to identify Arabic numerals. In such an example, the network 400 may include an output layer 450 of ten output neurons corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be a singular output neuron (not depicted). The output layer 450 is fed from an output connection 452. The output connection 452 provides the activations from the hidden section 420. In some embodiments, the output connections 452 may include weights and the neurons of the output layer 450 may include biases.

Training the neural network depicted by neural network 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The term forward propagation may also be used to describe the layout of a given neural network (e.g., recurrence, number of layers, number of neurons in one or more layers, layers being fully connected or not to other layers, etc.).

In contrast, back propagation may determine an error of the parameters (e.g., the weights and the biases) in the network 400 by starting with the output neurons 450 and propagating the error backward through the various connections 452, 424, 414 and layers 426, 422, respectively.

Back propagation can include performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination.

For example, neural network 400 may be a classification network. Additionally, the network 400 may receive a verbal input, for example, a command directed to a first of five voice devices. Further, the network 400 may determine that the verbal command is relatively most likely directed to a third voice device of the five voice devices. Additionally, the network 400 may determine that the next most likely voice device is a fifth voice device; and, that the next most likely voice device is a first voice device (and so on with the other input). Continuing the example, back propagation may alter the values of the weights of connections 414, 424, and 452; and may alter the values of the biases of the first layer of calculation neurons 422, the second layer of calculation neurons 426, and the output neurons 450. Further continuing the example, the back propagation may yield a future result that is a relatively more accurate classification of the same audio input that contains the same verbal command (e.g., ranking the verbal command as directed to the first of the five voice devices as the relatively most likely voice device).

EQUATION 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 400. The network 400 is provided a given number of training inputs n in a subset (or entirety) of training data that have input values x. The network 400 may yield output a from x and should yield a desired output y(x) from x. Back propagation or training of the network 400 should be a reduction or minimization of the objective function '0(w,b)' via alteration of the set of weights and biases. Successful training of network 400 should not only include the reduction of the difference between the answer a and the correct answers y(x) for the input values x, but given new input values (e.g., from additional training data, from validation data, etc.).

$$0(w,b) = 1/2n \, \Sigma_x \|y(x) - \alpha\|^2$$

Equation 2

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 400 may be small in any given iteration. Back propagation algorithms may repeat for many iterations to perform more accurate learning as a result of the relative smallness of any given iteration.

For example, neural network 400 may have untrained weights and biases, and back propagation may involve the stochastic gradient descent to train the network over a subset of training inputs (e.g., a batch of 10 training inputs from the entirety of the training inputs). Continuing the example, network 400 may continue to be trained with a second subset of training inputs (e.g., a second batch of 10 training input from the entirety other than the first batch), which can repeat until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, network 400 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Figure 5:
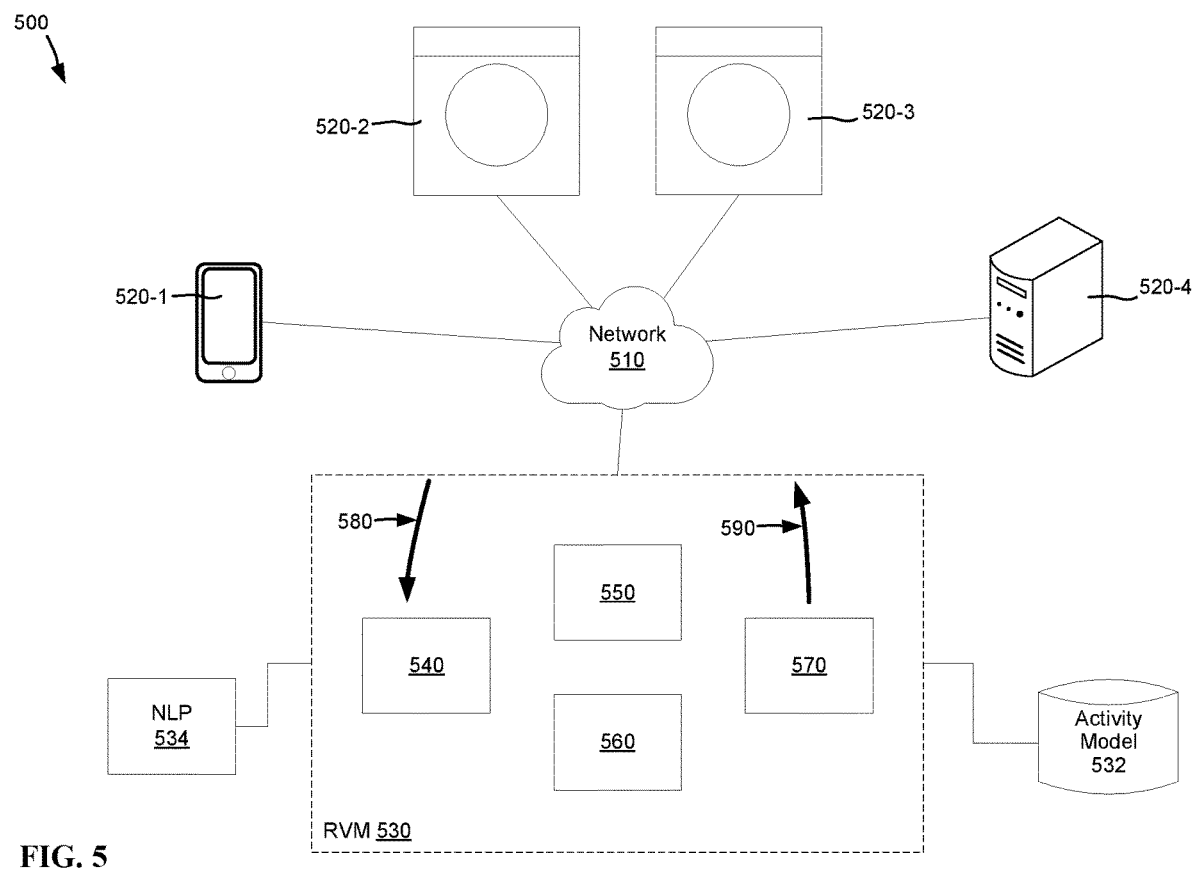
FIG. 5 depicts an example system of voice device management, consistent with some embodiments of the disclosure.

FIG. 5 depicts an example system 500 of voice device management, consistent with some embodiments of the disclosure. System 500 may be configured to perform RVM including monitoring activity of a user during interaction with voice-enabled or voice-controlled computing devices. System 500 may include at least the following: a network 510; one or more network connected devices 520-1, 520-2, 520-3, and 520-4; and an RVM 530.

The network 510 can be implemented using any number of suitable physical and/or logical communications topologies. The network 510 can include one or more private or public computing networks. For example, network 510 may comprise a private network (e.g., a network with a firewall that blocks non-authorized external access) that is associated with the workload. Alternatively, or additionally, network 510 may comprise a public network, such as the Internet. Thus, network 510 may form part of a packet-based network, such as a local area network, a wide-area network, and/or a global network such as the Internet. Network 510 can include one or more servers, networks, or databases, and can use one or more communication protocols to transfer data between elements of the system 500. Furthermore, although illustrated in FIG. 5 as a single entity, in other examples network 510 may comprise a plurality of networks, such as a combination of public and/or private networks. The communications network 510 can include a variety of types of physical communication channels or "links." The links can be wired, wireless, optical, and/or any other suitable media. In addition, the communications network 510 can include a variety of network hardware and software for performing routing, switching, and other functions, such as routers, switches, base stations, bridges, or any other equipment that may be useful to facilitate communicating data.

The connected devices 520 may be computing devices configured to perform one or more operations of RVM 530. The connected devices 520 may be computer systems, such as computer 100. The connected devices 520 may be cloud computing systems. For example, connected device 520-4 may be representative of one or more servers that make up cloud computing environment 50. The connected devices 520 may be voice devices. For example, connected device 520-1 may be a voice operated smart phone that is configured to receive and respond by way of verbal commands. The connected devices 520 may include appliances that are configured to perform routine tasks in response to input from a user. For example, connected device 520-2 may be a clothes washer and connected device 520-3 may be a clothes dryer. A user may perform actions to the clothes washer 520-2 and/or clothes dryer 520-3, such as physically placing dirty clothes into the clothes washer. A user may also perform voice commands to the clothes washer 520-2 and/or clothes dryer 520-3, such as speaking "Set the mode to 3" to refer to washing clothes under a third setting of five various clothes washing settings.

RVM 530 may include one or more operations of a configured set of software and/or hardware to perform voice device management. The RVM 530 may be in the form of a plurality of artificial intelligence constructs, such as machine learning models ("ML models"). The ML models may each be instances of a neural network, such as neural network 400. The ML models may include the following: a detection model 540, a missed input model 550, an incorrect input model 560, and a corrective action model 570. The RVM 530 may also include an activity model 532, and a natural language processor 534 ("NLP").

In some embodiments, the detection model 540, the missed input model 550, the incorrect input model 560, and the corrective action model 570 may execute machine learning on the activity model 532 using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The ML models of the RVM 530 may be configured to process language using artificial intelligence techniques, such as natural language processing, using a natural language processor 534. In some embodiments, the natural language processor 534 may include various components (not depicted) operating through hardware, software, or in some combination. For example, the natural language processor 534 may include one or more data sources, a search application, and a report analyzer. The natural language processor 534 may be a computer module that analyses the received content and other information. The natural language processor 534 may perform various methods and techniques for analyzing textual information (e.g., syntactic analysis, semantic analysis, etc.). The natural language processor 534 may be configured to recognize and analyze any number of natural languages. In some embodiments, the natural language processor 534 may parse passages of documents or content from speech received from a user. Various components (not depicted) of the natural language processor 534 may include, but are not limited to, a tokenizer, a part-of-speech (POS) tagger, a semantic relationship identifier, and a syntactic relationship identifier. The natural language processor 534 may include a support vector machine (SVM) generator to processor 534 the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., previous voice-activated routines, previous patterns of use that include spoken speech, information stored in the activity model 532). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor 534 may be a computer module that may parse a document and generate corresponding data structures for one or more portions of the document. For example, in response to receiving a speech received from a user at the natural language processing system, the natural language processor 534 may output parsed text elements from the data. In some embodiments, a parsed text element may be represented in the form of a parse tree or other graph structure. To generate the parsed text element, the natural language processor 534 may trigger computer modules including the tokenizer, the part-of-speech (POS) tagger, the SVM generator, the semantic relationship identifier, and the syntactic relationship identifier.

In some embodiments, the natural language processing system may leverage one or more of the example machine learning techniques to perform machine-learning (ML) text operations. Specifically, the RVM 530 may operate to perform machine-learning text classification and/or a machine-learning text comparison. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "orange is a fruit that grows on trees." Vectorization of the word "orange" may include setting input neurons of a neural network to the various words of the phrase including the word "orange." The output value may be an array of values (e.g., forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a fruit that grows on trees", other parts of a paragraph that contains the phrase, other parts of language).

In some embodiments, each of the ML models (e.g., detection model 540, missed input model 550, incorrect input model 560, and corrective action model 570) may be configured to perform differing operations.

The detection model 540 may be a fully connected neural network and may be configured to receive as input the current time and user interactions (e.g., physical activities, voice commands) from a user. The detection model 540 may include various outputs such as the name of a particular connected device 520, and whether a user interaction was expected but was not received. The detection model 540 may also perform an operation to determine a condition, such as whether an expected second or follow-up user interaction was expected (e.g., a softmax operation). For example, when any voice device is awakened by switching it on or placing any object like a coffee mug under a spout of a coffee machine at 7 am, the detection model 540 determines if those actions, devices, and/or times are a part of a regular routine, pattern, or usage scenario of a user.

The missed input model 550 may be a recurrent neural network configured to perform as an encoder/decoder. The missed input model 550 may receive as input a previous user interaction (e.g., the interaction received by the detection model 540). The missed input model 550 may also receive a previous timestamp (e.g., the timestamp of the previous user interaction received by the detection model 540), and a current timestamp (e.g., a time after the previous timestamp). The missed input model 550 may output a predicted time of follow-up or second instruction, and to output a predicted follow-up or second instruction. This may be considered a determination of a potential second input. The missed input model 550 may perform a classifier operation. A classifier operation may involve monitoring for a deviation from the potential second input and an identification of an activity anomaly. For example, the classifier operation may identify or predict an activity anomaly that includes a missing or missed command that is expected. The missed input model 550 may output the name of a particular connected device 520 as well as the identified value (e.g., yes, no) that a predicted command was missed. For example, if a first instruction was "grill at 300 degrees for 10 min", the missed input model 550 may begin determining the next most likely possible instruction and the time. The next highest possible instruction and length of time may be reduce the temperature to 200 degrees and grilling for 10 minutes. Additionally, the missed input model 550 may determine that this next highest possible instruction is expected in the 20 minutes after receiving the first instruction.

The incorrect input model 560 may be a recurrent neural network configured to perform as an encoder/decoder, such as a long short-term memory. The incorrect input model 560 may also include a dense and/or fully-connected layer. The recurrent portion of the incorrect input model 560 may pass data to the fully-connected layer. The incorrect input model 560 may also include an encoder that creates a latent space and a decoder that uses that latent space to generate the output (e.g., a variational autoencoder ("VAE")). The latent space created by the encoder may be in the form of two distributions—a mean distribution and a covariance distribution. Consequently, the incorrect input model 560 may be configured to analyze all the inputs and generate as output a gaussian distribution of the mean of all the inputs and a gaussian distribution of the standard deviation of all the inputs. The incorrect input model 560 may be configured to score the output and determine if the score is above a predetermined threshold. This may be considered a determination of a potential second input and/or monitoring for a deviation from the potential second input and an identification of an activity anomaly. If the score is above the predetermined threshold, then an anomalous input may be in the user interaction. For example, the incorrect input model 560 may determine the level of deviation of a command is above a predetermined threshold related to grilling on a stove. The expected command may be, "grill for 10 more minutes", but the actual command received is "grill for 15 more minutes" and the incorrect input model 560 may generate a score below the predetermined threshold related to the particular voice device and/or routine that involve the particular voice device. If the actual command received is, "Grill for 40 more minutes", then the incorrect input model 560 may generate a score above the predetermined threshold related to the particular voice device and/or routine.

The corrective action model 570 may be a recurrent neural network configured to perform encoding and/or decoding. The corrective action model 570 may receive input from the detection model 540, the missed input model 550, and the incorrect input model 560. The corrective action model 570 may also output a corrective action to a user.

The ML models of RVM 530 may work in concert to receive user interactions (e.g., physical activities and voice commands) interaction with various voice devices in an environment to identify an anomalous activity (e.g., input that is different from an expected input). Specifically, at 580 user interactions may be received from the connected devices 520. The user interactions may include voice commands, such as spoken "turn on the coffee machine", or verbal "wash the clothes for ten minutes", and the like. The corrective action model 570 may generate corrective actions at 590, and provide these corrective actions to a user. The corrective action may be in the form of a question, such as "did you mean to turn on the washer?", or "the washer has finished, do you want to start a drying cycle?" The corrective action may be in the form of a verbal statement, such as a sound file stating "you typically set the microwave to three minutes." The corrective action may be in the form of a visual statement. For example, connected device 520-1 may display a message that says, "Microwave oven is expecting another ten-minute two-hundred-degree grilling cycle" along with touch-screen buttons for "OK" or "Cancel".

FIGS. 6A, 6B, 7, 8, 9A, and 9B depict examples of training data for one or more parts of the RVM 530 to use in performing artificial intelligence techniques that identify anomalous input to voice devices and perform corrective actions in response. Specifically, the training data may include data inputs and data outputs to update and train machine learning models. The models and/or that trained data may be stored and/or updated to the activity model 532. The models may be further trained as additional real-world input is provided by usage of the system 500.

Figure 6A:
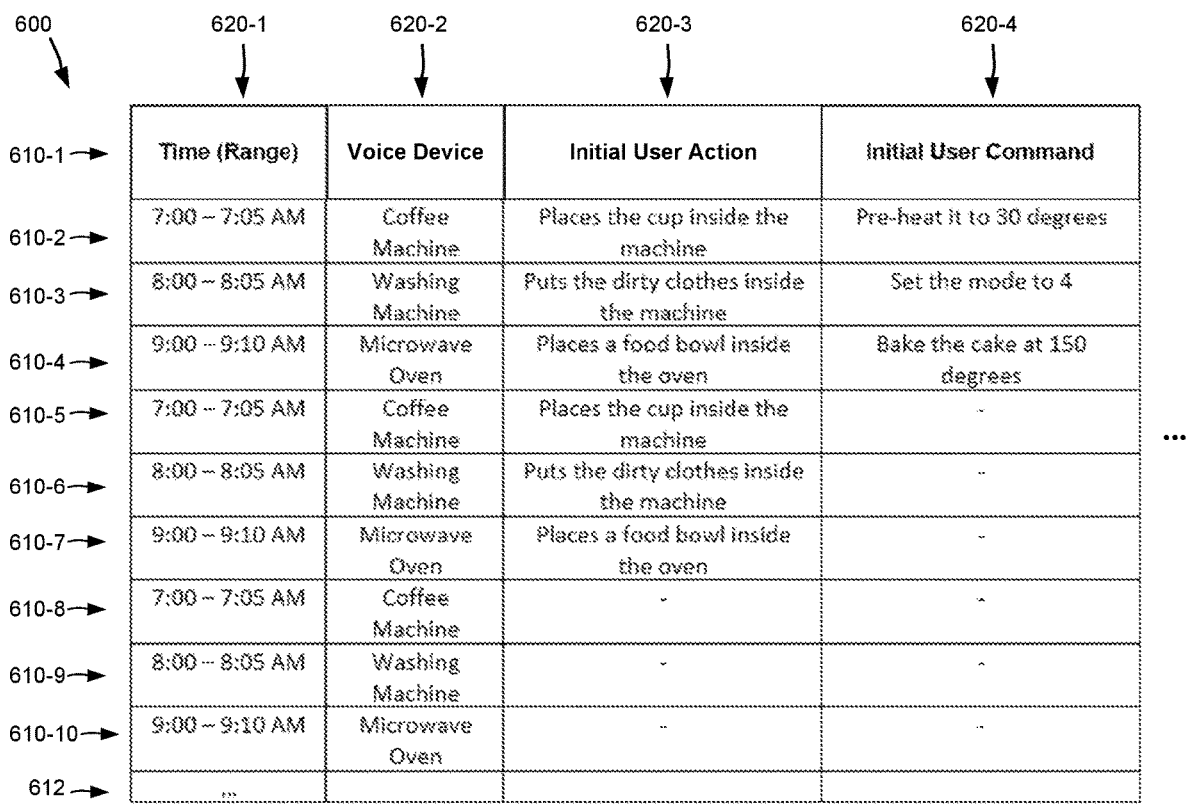
FIG. 6A depicts a first portion of training data for a first machine learning model of the system, for identifying anomalous input, consistent with some embodiments of the disclosure.
Figure 6B:
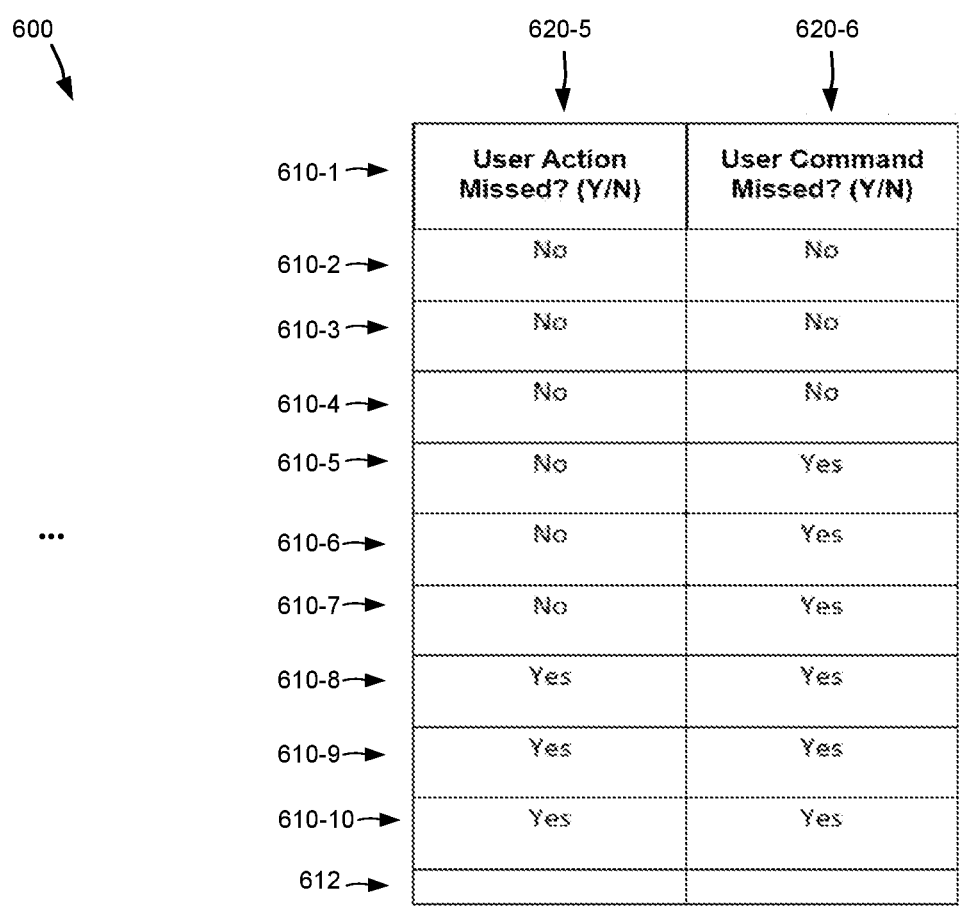
FIG. 6B depicts a second portion of training data for the first machine learning model of the system, consistent with some embodiments of the disclosure.

FIG. 6A depicts a first portion of training data 600 for a first machine learning model of the system 500 for identifying anomalous input, consistent with some embodiments of the disclosure. FIG. 6B depicts a second portion of training data 600 for the first machine learning model of the system 500, consistent with some embodiments of the disclosure. Specifically, FIG. 6A depicts multiple rows 610 of training data 600 that are to be provided to the detection model 540. Further, FIG. 6B depicts a continuation of the rows 610 of training data 600. Each row 610 represents a particular routine, pattern, or activity that may be processed by a neural network that is configured to detect anomalous operations of voice devices. Row 610-1 may represent a header row that includes descriptive information of the training data 600. Row 612 may represent additional rows of data that are not depicted but may be included in the training data 600.

Columns 620 may represent each element of training data 600 that might be used to train the and update the weights and/or biases of the detection model 540. Specifically, training of the detection model 540 may include only a subset of the elements 620 being provided as input, such as elements 620-1, 620-2, 620-3, and 620-4. Additional elements, such as elements 620-5 and 620-6, may be provided as part of an expected output. The expected output may be used as a comparison and for purposes of training a neural network of the detection model 540. For example, if the detection of the training data 600 does not yield an accurate identification of the presence of an anomalous physical action or voice command, then the expected output may be used to update the weights and biases of the detection model 540.

Figure 7:
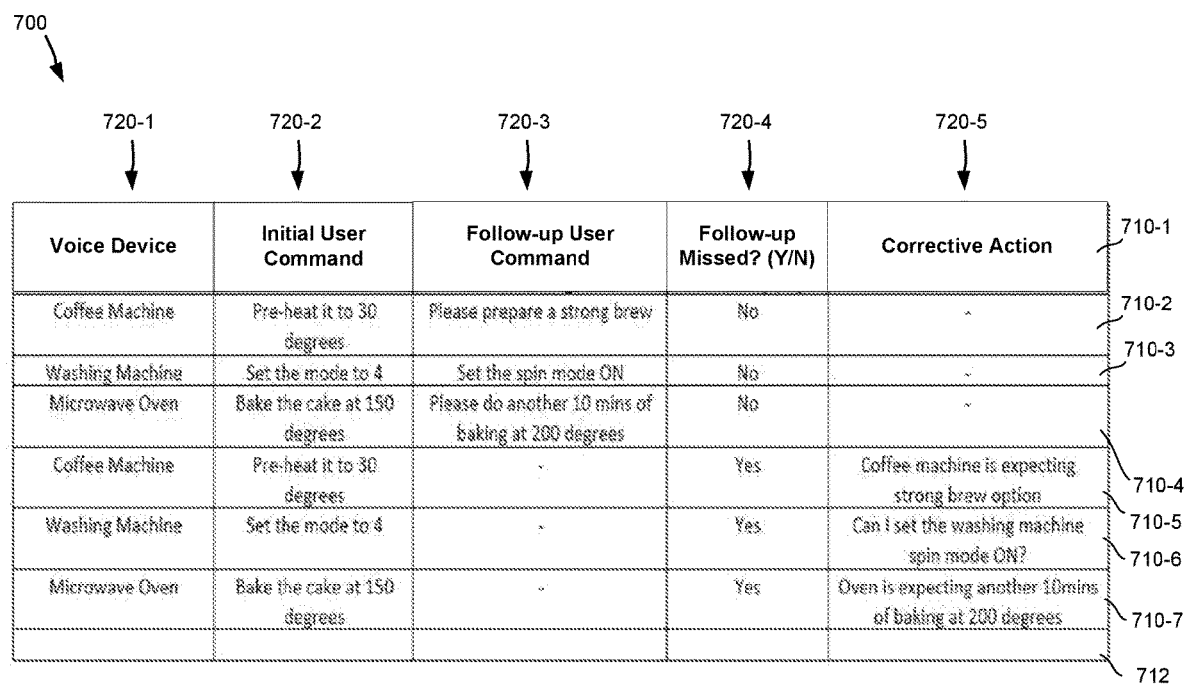
FIG. 7 depicts a portion of training data for a second machine learning model of the system, for identifying anomalous input, consistent with some embodiments of the disclosure.

FIG. 7 depicts a portion of training data 700 for a second machine learning model of the system 500 for identifying anomalous input, consistent with some embodiments of the disclosure. Specifically, FIG. 7 depicts multiple rows 710 of training data 700 that are to be provided to the missed input model 550. Each row 710 represents a particular routine, pattern, or activity that may be processed by a neural network that is configured to detect anomalous operations of voice devices. Row 710-1 may represent a header row that includes descriptive information of the training data 700. Row 712 may represent additional rows of data that are not depicted but may be included in the training data 700.

Columns 720 may represent each element of training data 700 that might be used to train the and update the weights and/or biases of the missed input model 550. Specifically, training of the missed input model 550 may include only a subset of the elements 720 being provided as input, such as elements 720-1, 720-2, 720-3, and 720-4. Additional elements, such as element 720-5, may be provided as part of an expected output. The expected output may be used as a comparison and for purposes of training a neural network of the missed input model 550. For example, if the detection of the training data 700 does not yield an accurate identification of an anomalous input that includes a missing follow-up voice command to a voice device, then the expected output may be used to update the weights and biases of the missed input model 550.

Figure 8:
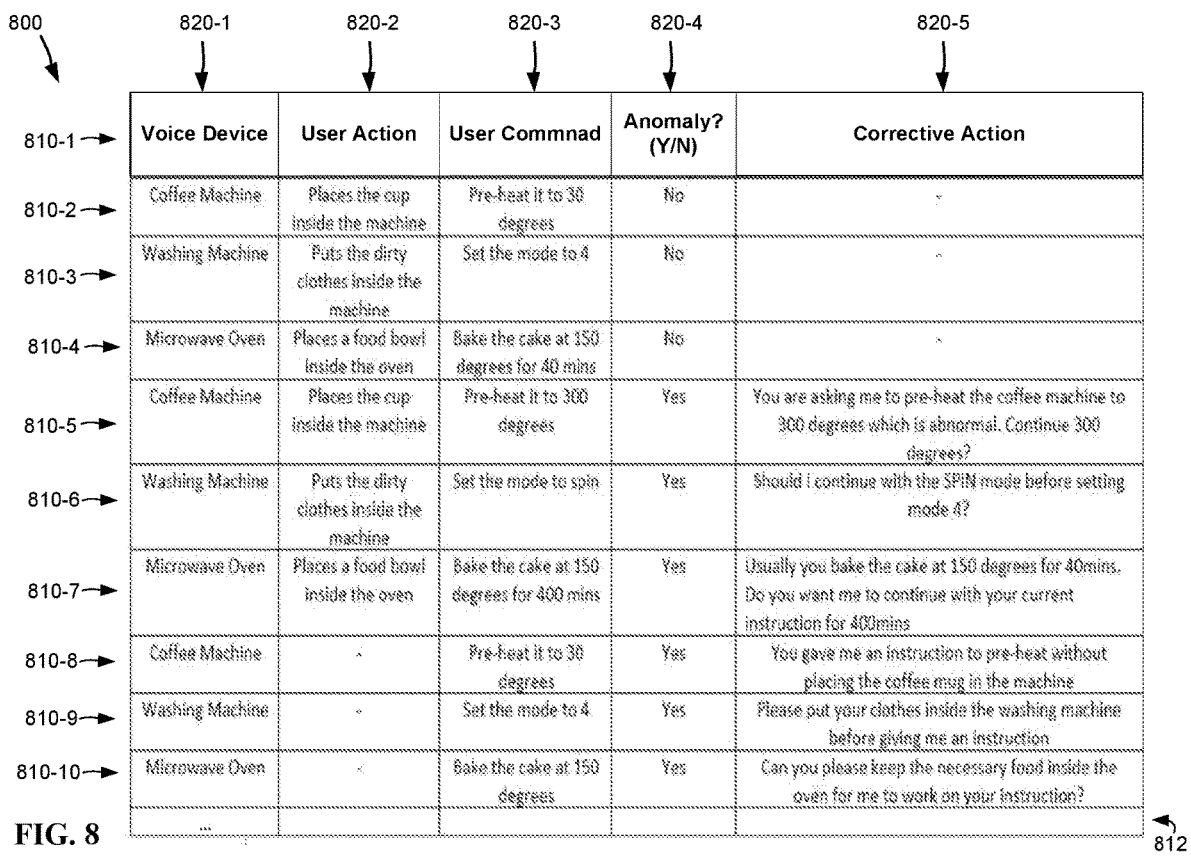
FIG. 8 depicts a portion of training data for a third machine learning model of the system, for identifying anomalous input, consistent with some embodiments of the disclosure.

FIG. 8 depicts a portion of training data 800 for a third machine learning model of the system 500 for identifying anomalous input, consistent with some embodiments of the disclosure. Specifically, FIG. 7 depicts multiple rows 810 of training data 800 that are to be provided to the incorrect input model 560. Each row 810 represents a particular routine, pattern, or activity that may be processed by a neural network that is configured to detect anomalous operations of voice devices. Row 810-1 may represent a header row that includes descriptive information of the training data 800. Row 812 may represent additional rows of data that are not depicted but may be included in the training data 800.

Columns 820 may represent each element of training data 800 that might be used to train the and update the weights and/or biases of the incorrect input model 560. Specifically, training of the incorrect input model 560 may include only a subset of the elements 820 being provided as input, such as elements 820-1, 820-2, 820-3, and 820-4. Additional elements, such as element 820-5, may be provided as part of an expected output. The expected output may be used as a comparison and for purposes of training a neural network of the incorrect input model 560. For example, if the detection of the training data 800 does not yield an accurate identification of an anomalous input that includes an unexpected physical action or an unexpected voice command to a voice device, then the expected output may be used to update the weights and biases of the incorrect input model 560.

Figure 9A:
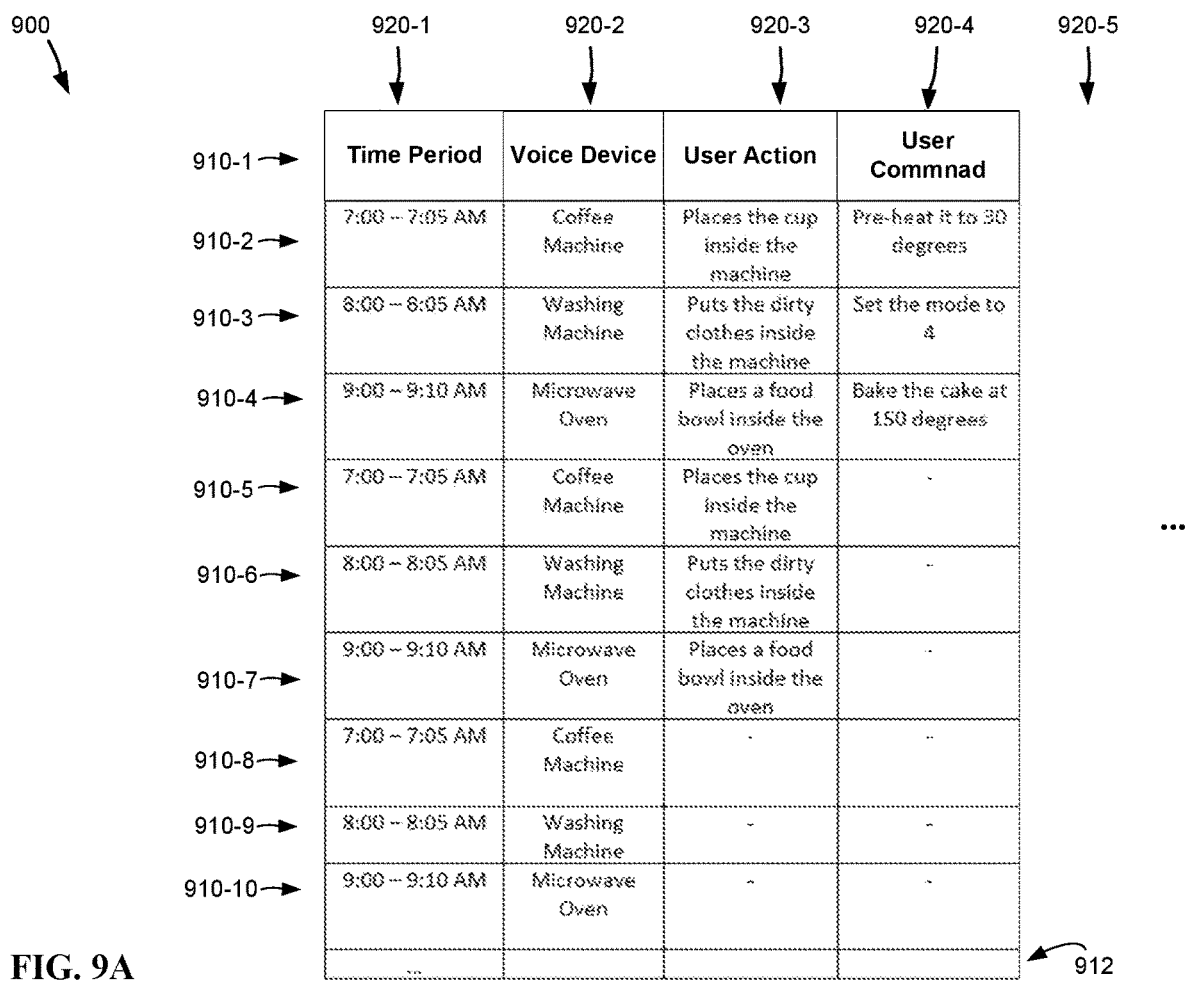
FIG. 9A depicts a first portion of training data for a fourth machine learning model of the system, for providing an accurate corrective action, consistent with some embodiments of the disclosure.
Figure 9B:
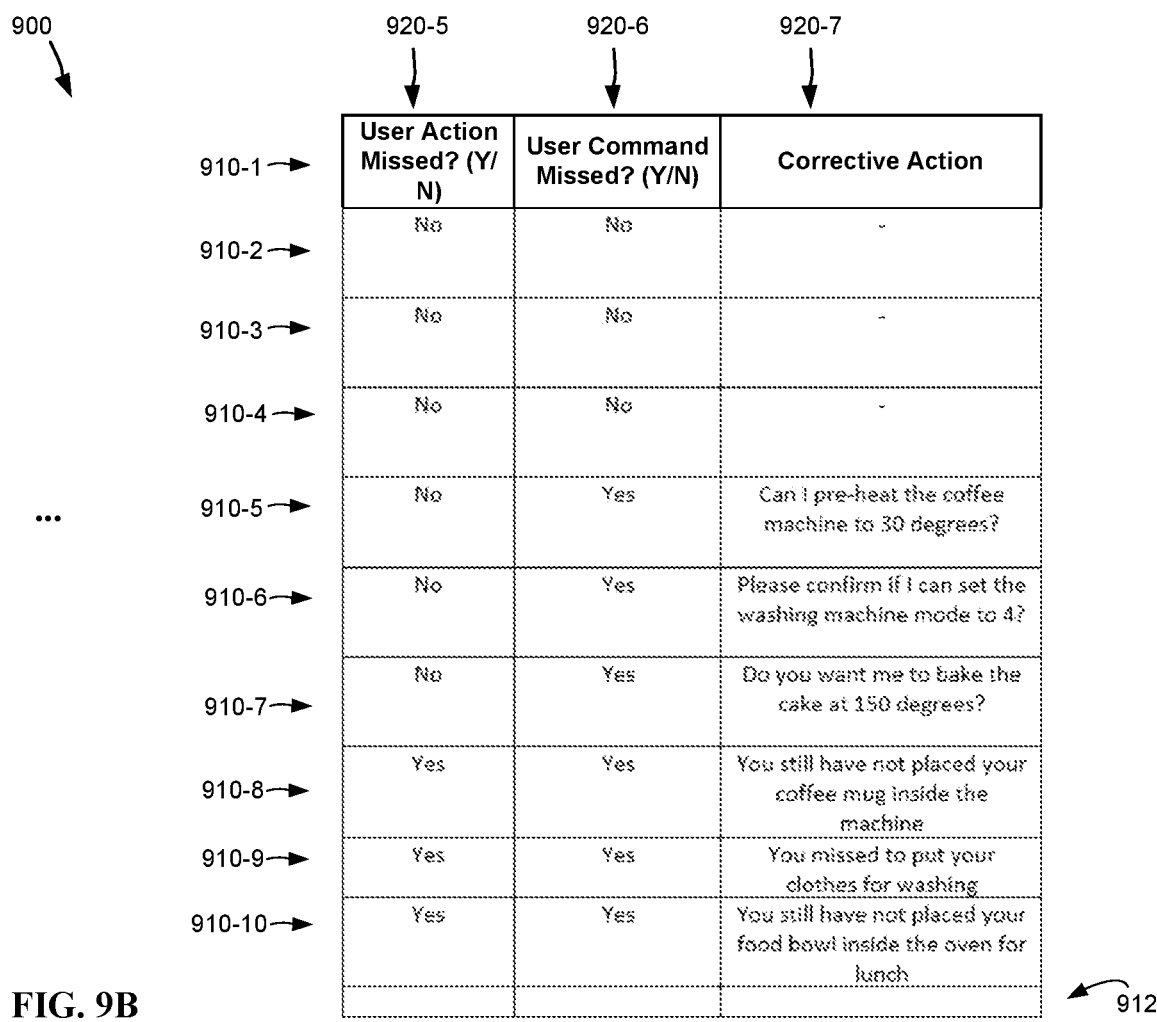
FIG. 9B depicts a second portion of training data for the fourth machine learning model of the system, consistent with some embodiments of the disclosure.

FIG. 9A depicts a first portion of training data 900 for a fourth machine learning model of the system 500 for providing an accurate corrective action, consistent with some embodiments of the disclosure. FIG. 9B depicts a second portion of training data 900 for the fourth machine learning model of the system 500, consistent with some embodiments of the disclosure. Specifically, FIG. 9A depicts multiple rows 910 of training data 900 that are to be provided to the corrective action model 570. Further, FIG. 9B depicts a continuation of the rows 910 of training data 900. Each row 910 represents a particular routine, pattern, or activity that may be processed by a neural network that is configured to format and generate a corrective action. Row 910-1 may represent a header row that includes descriptive information of the training data 900. Row 912 may represent additional rows of data that are not depicted but may be included in the training data 900.

Columns 920 may represent each element of training data 900 that might be used to train the and update the weights and/or biases of the corrective action model 570. Specifically, training of the corrective action model 570 may include only a subset of the elements 920 being provided as input, such as elements 920-1, 920-2, 920-3, and 920-4. Additional elements, such as elements 920-5, 920-6, and 920-7, may be provided as part of an expected output. The expected output may be used as a comparison and for purposes of training a neural network of the corrective action model 570. For example, if the detection of the training data 900 does not yield an accurate corrective action, then the expected output may be used to update the weights and biases of the corrective action model 570.

Figure 10:
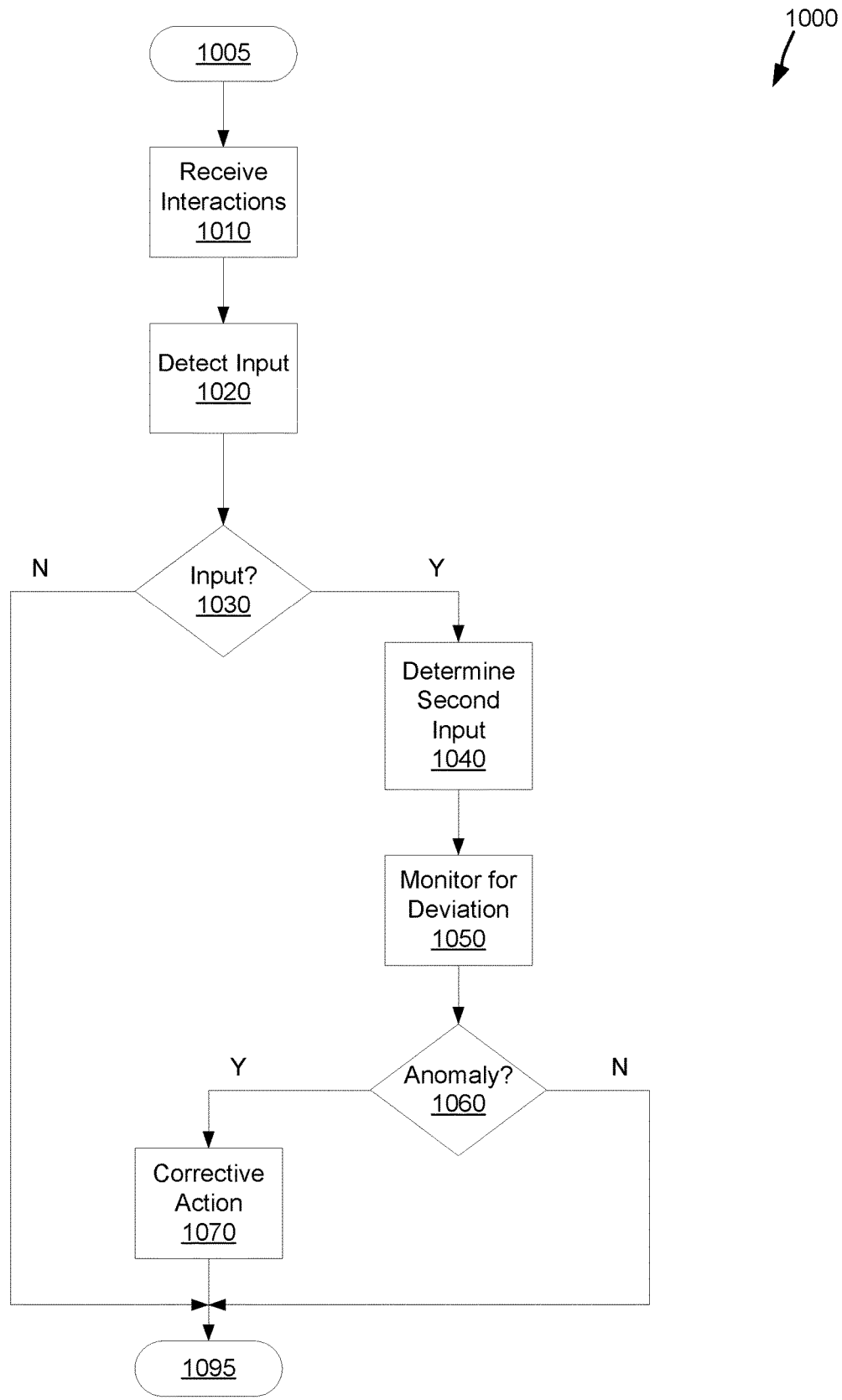
FIG. 10 depicts a method 1000 of performing corrective actions for voice devices, consistent with some embodiments of the disclosure.

FIG. 10 a method 1000 of performing corrective actions for voice devices, consistent with some embodiments of the disclosure. The method 1000 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Method 1000 may begin at 1005, by receiving one or more user interactions at 1010. The user interactions may be directed to a set of one or more voice devices. The voice devices may be connected devices in an environment, such as connected devices 520 in system 500. The user interactions may be received by a connected device, such as a desktop computer or other relevant computer system (e.g., connected device 520-1). The user interactions may include physical actions such as turning on a coffee maker, opening a door on a washing machine, or other movement of a user or placement of an item. The user interactions may be received at 1010 continuously, repeatedly (e.g., every second, every tenth of a second), or other relevant interval.

Based on the user interaction, a detection of a first input may begin at 1020. The detection may include processing by position, movement, voice, or other relevant sensors by a connected device. Specifically, the user interactions, received at 1010, may be transmitted across a network, such as a local area network, to a connected device. The detection may be performed by a voice device or by the connected device. Each input of the user interactions, including the first input may be provided to an activity model for processing. Specifically, the first input may operate to trigger a machine-learning model to perform one or more artificial intelligence operations to determine a particular type of activity, process, pattern, or routine that is related to the first input. For example, the placement of a coffee cup into a coffee machine may initiate a process to process that input and to determine if there is a related routine involving the placement.

If a first input is detected, at 1030:Y, then method 1000 may continue by determining if there is a second input at 1040. The determination may include using the activity model to make a prediction of the second input. In the example of the placement of the coffee cup, the determination may include performing machine learning to determine potential additional inputs that are directed towards the coffee cup.

At 1050, method 1000 may continue by monitoring for a deviation from the second input. The deviation may be a difference from the potential second input, that was determined at 1040, and any actual input that is received from the user interactions at 1010. The monitoring for the deviation may include comparing the output of the activity model to the stream of input received from the connected device. The deviation from a potential second input, may be a missing command. A missing command may be a command that is not received within a certain predetermined threshold. For example, based on the activity model it may be determined that after laundry is placed in a voice device that is a smart washing machine, a predetermined threshold is that a command should be received with forty-five second. The deviation from a potential second input, may be an unexpected physical input or verbal command. The unexpected command may be a command this is inconsistent with a predetermined pattern or routine of input. For example, based on the activity model it may be determined that after a voice device that is a smart oven is heated to 400 degrees Fahrenheit for twenty minutes, that the next input should be a command to heat to 150 degrees for thirty minutes.

If an activity anomaly is identified, at 1060:Y, method 1000 may continue by performing a corrective action at 1070. The corrective action 1070 may be in the form of a command, such as a command to instruct the user of the anomalous input. The corrective action 1070 may be in form of a request, such as a question or prompt provided to a user. The corrective action 1070 may be provided by one of the voice devices, such as a smart appliance speaking the corrective action to a user. The corrective action 1070 may be provided by one of the connected devices, such as a smart watch worn by a user. After the corrective action 1070 is provided at 1070, or if there was no anomaly identified at 1060:N, or if there was no first input detected at 1030:N, method 1000 may end at 1095.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A processor-implemented method for managing voice-based devices using a system of machine learning models, the method comprising:
    receiving, by a first connected device, one or more user interactions directed to a set of one or more voice-controlled devices in an environment;
    detecting, based on the user interactions, a first input to a first voice-controlled device of the set of voice-controlled devices using a trained detection model;
    determining, in response to the first input and based on an activity model, a potential second input to the set of voice-controlled devices using a trained missed input model and a trained incorrect input model;
    monitoring, in response to the first input and from the user interactions, for a deviation from the potential second input using the trained incorrect input model;
    identifying, based on the monitoring, an activity anomaly in the environment using the trained incorrect input model;
    determining, in response to the activity anomaly, a correction action using a trained corrective action model; and
    performing the determined corrective action using at least one voice-controlled device in the set of one or more voice-controlled devices.

2. The method of claim 1, wherein the first connected device is a voice-controlled device of the set of voice-controlled devices.

3. The method of claim 1, wherein the first input includes at least one voice command by the user.

4. The method of claim 1, wherein the first input includes at least one physical action by the user.

5. The method of claim 1, wherein the activity model includes a machine learning model.

6. The method of claim 5, wherein:
    the machine learning model is related solely to the first voice-controlled device; and
    the activity model includes a second machine learning model related solely to a second voice-controlled device of the set of voice-controlled devices.

7. The method of claim 5, wherein the method further comprises:
    training the machine learning model on a set of training data; and
    generating, based on the machine learning model, one or more voice-controlled device routines, wherein the voice-controlled device routines include a plurality of potential inputs to one or more voice-controlled devices of the set of voice-controlled devices including the potential second input.

8. The method of claim 7, wherein the training data includes previously issued voice commands.

9. The method of claim 7, wherein the training data includes previously issued physical actions.

10. The method of claim 7, wherein the training data also includes time information describing one or more temporal relationships.

11. The method of claim 10, wherein a first relationship of the temporal relationships includes a predetermined threshold amount of time between a potential first input to a first voice-controlled device and the second potential input to the first voice-controlled device.

12. The method of claim 1, wherein the corrective action comprises:
    generating, based on the deviation, a response related to the potential second input;
    transmitting the response to a client device of the user; and
    causing the client device of the user to provide the response.

13. The method of claim 12, wherein the response is generated based on a machine learning model.

14. The method of claim 1, wherein the potential second input includes an expected interaction, and the deviation is an absence of the expected interaction.

15. The method of claim 1, wherein the potential second input includes a first interaction, and the deviation is a second interaction.

16. The method of claim 1, wherein the potential second input includes a range of predetermined acceptable values and the deviation is outside of the range.

17. The method of claim 1, wherein:
    the potential second input includes a range of predetermined acceptable values including a low value and a high value; and
    the deviation is near one of the low value and the high value of the range, and
    the method further comprises:
        updating, based on the deviation, the activity model.

18. The method of claim 1, wherein the potential second input includes an expected interaction within a predetermined threshold amount of time and the deviation is an interaction outside of the predetermined threshold amount of time.

19. A computer system for managing voice-based devices using a system of machine learning models, the computer system comprising:
    one or more processors, one or more computer-readable memories, one or more computer-readable storage medium, and program instructions stored on at least one of the one or more storage medium for execution by at least one of the one or more processors via at least one of the one or more memories, wherein the computer system is capable of performing a method comprising:
        receiving, by a first connected device, one or more user interactions directed to a set of one or more voice-controlled devices in an environment;
        detecting, based on the user interactions, a first input to a first voice-controlled device of the set of voice-controlled devices using a trained detection model;
        determining, in response to the first input and based on an activity model, a potential second input to the set of voice-controlled devices using a trained missed input model and a trained incorrect input model;
        monitoring, in response to the first input and from the user interactions, for a deviation from the potential second input using the trained incorrect input model;
        identifying, based on the monitoring, an activity anomaly in the environment using the trained incorrect input model;
        determining, in response to the activity anomaly, a correction action using a trained corrective action model; and
        performing the determined corrective action using at least one voice-controlled device in the set of one or more voice-controlled devices.

20. A computer program product for managing voice-based devices using a system of machine learning models, the computer program product comprising:
    one or more computer-readable storage medium and program instructions stored on at least one of the one or more storage medium, the program instructions executable by a processor to cause the processor to perform a method comprising:
receiving, by a first connected device, one or more user interactions directed to a set of one or more voice-controlled devices in an environment;
detecting, based on the user interactions, a first input to a first voice-controlled device of the set of voice-controlled devices using a trained detection model;
determining, in response to the first input and based on an activity model, a potential second input to the set of voice-controlled devices using a trained missed input model and a trained incorrect input model;
monitoring, in response to the first input and from the user interactions, for a deviation from the potential second input using the trained incorrect input model;
identifying, based on the monitoring, an activity anomaly in the environment using the trained incorrect input model;
determining, in response to the activity anomaly, a correction action using a trained corrective action model; and
performing the determined corrective action using at least one voice-controlled device in the set of one or more voice-controlled devices.

* * * * *